L. L. SCOTT.
CHUCK FOR PERCUSSION DRILLS.
APPLICATION FILED AUG. 8, 1914.
1,182,934.
Patented May 16, 1916.
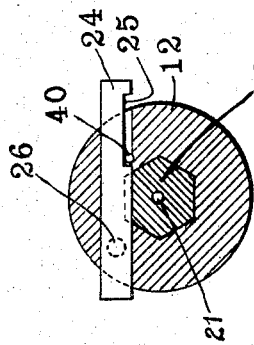
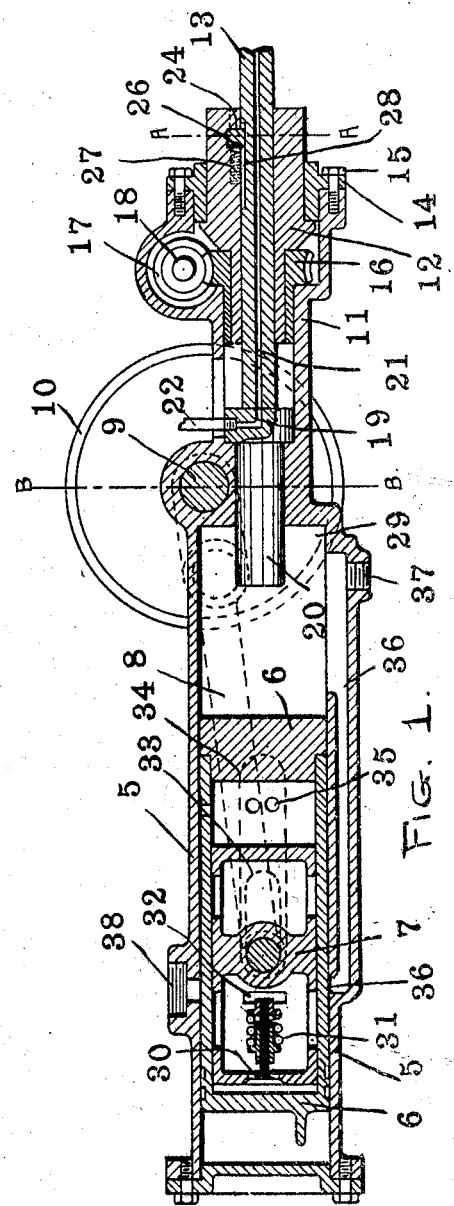
WITNESSES:
INVENTOR
Lyman L. Scott
BY
ATTORNEY

UNITED STATES PATENT OFFICE.

LEWIS L. SCOTT, OF ST. LOUIS, MISSOURI.

CHUCK FOR PERCUSSION-DRILLS.

1,182,934.     Specification of Letters Patent.     Patented May 16, 1916.

Application filed August 8, 1914. Serial No. 855,749.

*To all whom it may concern:*

Be it known that I, LEWIS L. SCOTT, a citizen of the United States of America, residing at the city of St. Louis, State of Missouri, have invented a certain new and useful Chuck for Percussion-Drills, of which the following is such a full, clear, and exact description as will enable any one skilled in the art to which it appertains to make and use the same, reference being had to the accompanying drawings, forming part of this specification.

My invention relates to improvements in that class of drill chucks shown and described in my prior United States Patent No. 1,058,268, granted April 8, 1913.

In the form of chuck described in my prior patent above referred to, I have found it necessary, in practice, to provide a spring buffer to cushion the blow on the drill bit when the said bit reaches its extreme limit of travel.

One of the objects of my present invention is to obviate the necessity of such a spring cushion and this result I obtain by providing the forward end of the cylinder with an air chamber forming a cushion for the piston and, at the same time, allowing the movement between the drill bit and the chuck to be such that the drill bit may move entirely out of the path of the piston.

My invention also consists in certain other novel features and details of construction, all of which are described in the following specification and pointed out in the claims appended hereto.

In the accompanying drawings, which illustrate one form of chuck made in accordance with my invention, Figure 1 is a vertical longitudinal section; and Fig. 2 is a cross section taken on the line A—A of Fig. 1.

Like marks of reference refer to similar parts in both views of the drawings.

5 represents a cylinder containing an outer floating piston 6 and an inner piston 7 which is connected by pitman rods 8 with a crank shaft 9 mounted in the lower end of the cylinder 5. The crank shaft 9 is preferably provided with a fly wheel 10. Carried by an extension 11 of the cylinder 5 is a chuck 12 adapted to receive the shank of the drill bit 13. The chuck 12 is held in position by a cap 14 secured by screws 15. The chuck 12 is provided with a worm wheel 16 engaging with a worm 17 mounted on a cross shaft 18. This cross shaft 18 is driven from the crank shaft 9 by any suitable gearing which is not shown as it forms no part of the present invention. The rear end of the drill bit 13 bears against a block 19 carried by a rod 20 which, in practice, forms an extension of the drill bit and is struck by the lower face of the outer floating piston 6. The drill bit 13 may be provided with a central opening 21 communicating with a supply pipe 22 for removing the drillings from the hole formed by the bit. The chuck 12 has passing laterally through it a locking bar 24, best shown in Fig. 2. This locking bar 24 is provided with a notch 25 which is adapted to allow the drill bit 13 to move into and out of position when the said notch is brought into alinement with the drill bit. In order to hold the locking bar 24 in position, I provide a ball 26 seating in a recess in the said bar and normally held in position by means of a spring 27.

In order to allow of longitudinal movement between the drill bit and the chuck, I provide the drill bit 13 with a slot 28. This slot 28 is of such length as to allow the drill bit to move downward to such an extent that the rear end of the rod 20 will not be struck by the end of the piston 6 when the drill bit reaches its extreme lower position. I also provide the cylinder 5 with an extension 29 at its lower end, which extension forms an air chamber to cushion the floating piston 6 when the said piston reaches its extreme downward movement. The use of this air chamber, together with a slot 28, enables me to dispense with any mechanical cushioning means for the drill bit.

In order to allow the air to enter between the upper end of the internal piston 7 and the external floating piston 6, I provide a valve 30 in the rear face of the said external piston, which valve is controlled by a suitable spring 31. Air is allowed to enter the interior of the inner piston 7 through an opening 32, which opening 32 is adapted to be brought into alinement with a slot 33 formed in the outer piston 6 and a slot 34 formed in the cylinder 5. Air is allowed to enter between the lower end of the interior piston 7 and the outer piston 6 through ports 35 adapted to communicate with the said slot 34.

36 is a passageway for the fuel from the lower end of the cylinder 5. Fuel is adapted to enter the lower end of the cylinder 5 through a port 37.

38 is a discharge port for carrying the burnt gases from the cylinder 5.

The operation of my engine is as follows: Supposing the parts to be substantially in the position shown in Fig. 2 and a charge of compressed gas to be contained between the upper end of the outer piston 6 and the head of the cylinder 5. The said charge is ignited by any suitable igniting mechanism (not shown). The pistons 6 and 7 will then be driven forward until the piston 6 strikes against the end of the rod 20, thus delivering the force of the charge against the drill bit. In the normal operation of the machine, this will take place before the interior piston has reached the end of its travel. As this piston is connected by means of pitman rods 8 with the crank shaft 9, the said piston will continue its travel for some distance after the outer piston 6 has been stopped by contact with the rod 20. As the interior piston 7 moves forward, air will be allowed to enter into the space between the upper end of the said piston and the piston 6 through the valve 30. Inasmuch as this valve 30 is placed in the end face of the piston, air will be allowed to enter between the two pistons when only a very slight movement takes place. This would not be accomplished in the construction shown in applicant's prior patent, above referred to, where the port for allowing the air to enter between the two pistons is arranged in the outer piston at some distance from its end. When the inner piston begins its return movement, the air between the two pistons will form a cushion to force the outer piston back against the charge contained between the end of the outer piston and the head of the cylinder in case the drill is fed down to its extreme limit of travel. The outer piston 6, in its forward movement, will enter the air chamber 29, forming an extension of the cylinder 5, and the effect of such air chamber will be to cushion the blow and thus avoid injury to the mechanism. By means of the locking bar 24, the drill bit 13 is effectively held in position in the chuck 12 and, at the same time, the drill bit is readily removed and replaced as only longitudinal movement of the locking bar 24 is necessary to release or to lock the bit. A pin 40, shown in Fig. 2, may be provided to prevent the locking bar 24 being entirely removed from the chuck.

Having fully described my invention, what I claim as new and desire to secure by Letters-Patent of the United States is:

1. In a percussion drill, the combination with a chuck provided with an angular longitudinal passage for the drill bit, of a locking bar in said chuck and limiting the movement of the drill, and a drill of angular cross section provided with a slot adapted to be engaged by the said locking bar.

2. In a percussion drill, the combination with a chuck provided with a longitudinal passage for the drill bit, of a locking bar for limiting the movement of the drill, said locking bar sliding laterally in said chuck and provided at one end with a notch to allow the insertion and removal of the drill bit, means for holding said locking bar in position, and a drill bit provided with a slot adapted to engage with said locking bar.

3. In a percussion drill, the combination with a chuck provided with a longitudinal passage for the drill bit, of a locking bar sliding laterally in said chuck for limiting the movement of the drill, said locking bar being provided at one end with a notch to allow the insertion and removal of the drill bit, means for yieldingly holding said locking bar in position, and a drill bit provided with a slot adapted to engage with said locking bar.

4. In a percussion drill, the combination with a chuck provided with a longitudinal passage for the drill bit, of a locking bar sliding laterally in said chuck for limiting the movement of the drill, said locking bar being provided at one end with a notch to allow the insertion and removal of the drill bit, a spring detent engaging with one side of said locking bar for yieldingly holding it in position, and a drill bit provided with a slot adapted to engage with said locking bar.

In testimony whereof, I have hereunto set my hand and affixed my seal in the presence of the two subscribing witnesses.

LEWIS L. SCOTT. [L. S.]

Witnesses:
W. A. ALEXANDER,
G. M. SHORE.